Feb. 11, 1936.       S. SCHNELL       2,030,272
BRAKE ACTUATING MECHANISM
Filed Jan. 26, 1934
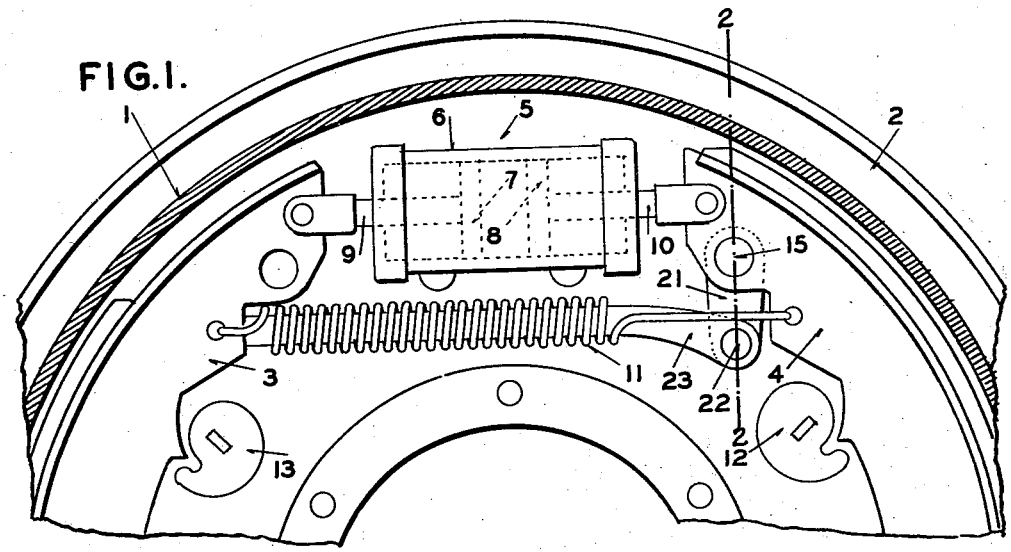
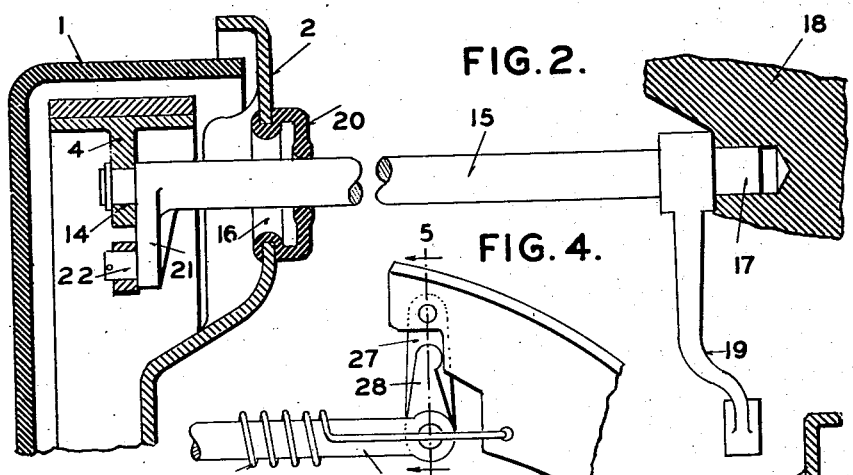
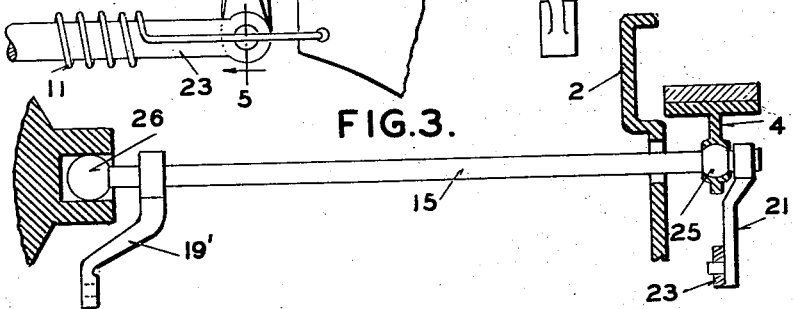
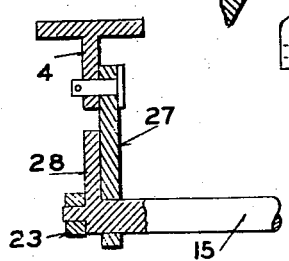
Inventor
STEVE SCHNELL
By *E. E. Huffman*
Att'y Patented Feb. 11, 1936

2,030,272

UNITED STATES PATENT OFFICE 2,030,272

BRAKE ACTUATING MECHANISM

Steve Schnell, Overland, Mo., assignor to Wagner Electric Corporation, St. Louis, Mo., a corporation of Delaware Application January 26, 1934, Serial No. 708,346

8 Claims. (Cl. 188—78)

My invention relates to brake actuating mechanism and more particularly to "mechanical" means for expanding the brake shoes or brake band into engagement with the drum, which is adapted for incorporation in braking mechanism of the type in which the brakes are hydraulically-actuated in the normal operation of the vehicle.

One of the objects of my invention is to construct a mechanical expanding device of the full floating type which will produce substantially equal pressures on the expansible ends of the brake.

Another object of my invention is to incorporate in an existing hydraulically-actuated brake a mechanically-actuated expanding device which can be readily installed without substantial alteration of standard structures, which will occupy a minimum amount of space, and which will be economical to manufacture.

Other objects of my invention will become apparent from the following description taken in connection with the accompanying drawing showing several embodiments thereof, in which Figure 1 is a side view of my novel mechanical expanding means incorporated in a hydraulically-actuated brake; Figure 2 is a cross-sectional view on the line 2—2 of Figure 1 showing the actuating shaft; Figure 3 is a view similar to that of Figure 2 showing a modified form of the actuating shaft; Figure 4 is a partial view of a modified form of expanding means; and Figure 5 is a cross-sectional view on the line 5—5 of Figure 4.

Referring to Figures 1 and 2, the numeral 1 indicates a brake drum, the open side of which is provided with a backing plate 2 for supporting the friction device. The ends 3 and 4 of the friction device may be either the expanding ends of a two-shoe brake, or of a band brake. The ends of the brake are adapted to be expanded by the usual hydraulic motor 5 secured to the backing plate, this motor comprising a fixed cylinder 6 connected to a compressor (not shown) and a pair of oppositely moving pistons 7 and 8 connected to the ends 3 and 4, respectively, of the brake by means of the piston rods 9 and 10. The brake is maintained in "off" position by the coiled retracting spring 11, the ends of which are hooked to the ends 3 and 4 of the brake. The "off" position clearance of the friction device is determined by the adjustable stops 12 and 13.

It is readily seen, from the above described hydraulically-actuated brake structure, that little space is available for mechanical means for actuating the friction device, which mechanical actuating means is necessary to provide a "parking" brake. However, in accordance with my invention I have devised a mechanical expanding device which can be incorporated in a brake structure without the necessity of any alterations and by the use of a minimum number of parts.

The end 4 of the brake is provided with an opening 14 in which is journaled one end of a rotatable actuating shaft 15. This shaft extends through an enlarged opening 16 in the backing plate and has its outer end 17 journaled in a suitable support 18. This support is shown as the housing for the differential, although a special support may be provided if desired, as for example, a support carried by the axle housing. The shaft 15 is sufficiently flexible to permit the brake end of the shaft to be movable with the end 4 of the brake. The shaft 15 has secured thereto, adjacent the support 18, an arm 19 which is connected by suitable rodding to the manually-actuated lever (not shown), situated adjacent the vehicle operator. A suitable boot 20 prevents dirt and other foreign matter from entering the brake through the backing plate opening 16.

The inner end of the shaft 15 adjacent the end 4 of the brake, is provided with a downwardly extending integral arm 21 having a pivot pin 22 on its outer end. A rod 23 has one of its ends pivoted to the pin 22 and its other end in abutting relation with the end 3 of the brake, the rod extending through and being supported by the coiled retracting spring 11. This arrangement of the cross rod 23 is an important feature of my invention, since by it I am able to support the rod without attaching special means to the backing plate. Also, by having the rod within the coiled spring, it is unnecessary to reorganize the usual structure to produce sufficient space for the mechanical expanding means.

In the operation of the mechanical expanding device, when the shaft 15 is actuated by the means of the arm 19, the arm 21 is rotated in a clockwise direction, thereby moving rod 23 to the left and expanding the friction device. The force applied to rod 23 reacts on the end 4 of the friction device to give substantially equal expanding pressure on each end of the friction device. The device is full floating since the inner end is in no way restrained from free movement with the end 4. The reaction of the actuating force applied to lever 19 is taken by the support 18.

The above described embodiment of my invention is adapted for use with brakes which are mounted on wheels suspended from the axle. Figure 3 discloses a modified form which is applicable to brakes used on wheels suspended by independent springs which permit the wheel and brake to have relative movement with respect to the support 18.

In Figure 3 the construction is the same as shown in Figures 1 and 2 except as to the journaling of the shaft in the support 18 and the end 4 of the friction device. As shown, the shaft 15' is provided with a spherical portion 25 which fits in a cooperating spherical bearing surface in the end of the friction device. The support 18, which may or may not be the differential housing, is provided with a socket for receiving the spherical end 26 of the shaft. The outer end of the actuating arm 19' for the shaft is shown as slightly off-set so that the reaction to the operating force will be taken directly by the spherical bearing 26.

In Figures 4 and 5 a slightly modified form of expanding means is shown. The rotatable shaft 15 instead of being journaled in the end of the brake 4 is journaled in a link 27 which is pivoted to the end 4 of the brake. The inner end of the shaft 15 is provided with an integral arm 28, the free end of which is adapted to engage the end 4 of the brake. The rod 23 which extends through the coiled spring 11 is pivoted directly to the end of the shaft 15. When the shaft 15 is rotated in a clockwise direction, the arm 28 is forced against the end 4 of the brake and the free end of the rod 23 against the other end 3 of the brake, thus expanding it into engagement with the drum. The link 27 not only supports the shaft but permits the inner end thereof to move freely during the expanding action.

Although I have shown the "mechanical" expanding means as being used in brake mechanism, which also embodies hydraulic actuating means, my apparatus may, of course, be used as the only brake actuating means.

Having fully described my invention, what I claim as new and desire to secure by Letters Patent of the United States is:

1. In braking apparatus, the combination of a drum, a friction element for engaging the drum and provided with a coiled spring connected to the friction element for retracting it from the drum, and means for moving the brake into engagement with the drum, said means comprising a rod extending through the coils of said spring.

2. In braking apparatus, the combination of a rotatable drum, a friction device for engaging the drum and provided with a pair of adjacent expansible ends, a coiled spring connected to the expansible ends for retracting the friction device from the drum, and means for expanding the friction device, said means comprising a rod extending through the coils of said spring.

3. In braking apparatus, the combination of a rotatable drum, a friction device for engaging the drum and provided with a pair of adjacent expansible ends, a coiled spring for retracting the friction device from the drum, means for expanding the friction device, said means comprising an arm pivotally mounted on one end of the friction device, a rod pivoted to said arm and extending through the coils of said spring into operative engagement with the other end of said friction device, and means for rotating said arm.

4. In braking apparatus, the combination of a rotatable drum, a friction device engaging the drum and provided with a pair of adjacent expansible ends, a coiled spring for retracting the friction device from the drum, means for expanding the friction device, said means comprising a rotatable shaft journaled in one end of the friction device, an arm secured to said shaft, a rod pivoted to said arm and extending through the coils of said spring into operative engagement with the other end of said friction device, and means for rotating said shaft.

5. In braking apparatus, the combination of a rotatable drum, a friction device for engaging the drum and provided with a pair of adjacent expansible ends, means for expanding said friction device, said means comprising a fixed support laterally spaced from the friction device, a rotatable shaft, means for universally journaling one end of said shaft to the support, means for universally journaling the other end in one end of the friction device, whereby the last named end of the shaft may have relative movement to the support, and means operable by the rotation of the shaft for moving the ends of the friction device in opposite directions.

6. In braking apparatus, the combination of a rotatable drum, a friction device for engaging the drum and provided with a pair of adjacent expansible ends, means for expanding said friction device, said means comprising a fixed support laterally spaced from the friction device, a rotatable shaft, means for universally journaling one end of said shaft to the support, means for universally journaling the other end in one end of the friction device, whereby the last named end of the shaft may have relative movement to the support, an arm secured to the shaft adjacent the end of the friction device, a rod pivoted to the arm and in free abutting relation with the other end of the friction device, and means for supporting said rod for free longitudinal movement.

7. In braking apparatus, the combination of a rotatable drum, a friction device for engaging the drum and provided with a pair of adjacent expansible ends, a coiled spring for retracting the friction device from the drum, a fixed support laterally spaced from the friction device, a rotatable shaft, one end of said shaft being journaled in said support by means of a ball and socket and the other end being journaled in one end of the friction device by means of a ball and socket, an arm secured to the shaft adjacent the friction device, a rod pivoted to said arm and extending through the coils of said spring into operative engagement with the other end of said friction device, and means for rotating said shaft.

8. In braking apparatus, the combination of a rotatable drum, a friction device for engaging the drum and provided with a pair of adjacent expansible ends, a support laterally spaced from the friction device, a rotatable shaft having one end journaled in said support, a link pivotally supporting the other end of the shaft from one end of the friction device, an arm secured to the last named end of the shaft and cooperating with said end of the friction device, a rod pivoted to said shaft and operatively connected to the other end of the friction device, and means for rotating said shaft.

STEVE SCHNELL.